(12) United States Patent
Seifert

(10) Patent No.: US 9,080,450 B2
(45) Date of Patent: Jul. 14, 2015

(54) STIRLING ENGINE WITH FLAPPING WING FOR AN EMISSION-FREE AIRCRAFT

(71) Applicant: EADS DEUTSCHLAND GMBH, Munich (DE)

(72) Inventor: Jost Seifert, Manching (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 108 days.

(21) Appl. No.: 13/724,670

(22) Filed: Dec. 21, 2012

(65) Prior Publication Data

US 2013/0164130 A1   Jun. 27, 2013

(30) Foreign Application Priority Data

Dec. 22, 2011   (DE) .......................... 10 2011 122 071

(51) Int. Cl.
| | |
|---|---|
| B64C 33/00 | (2006.01) |
| F01D 5/12 | (2006.01) |
| B64C 39/00 | (2006.01) |
| B64D 27/02 | (2006.01) |
| B64D 27/24 | (2006.01) |

(52) U.S. Cl.
CPC ............... *F01D 5/12* (2013.01); *B64C 39/005* (2013.01); *B64D 27/02* (2013.01); *B64D 27/24* (2013.01); *Y02T 50/62* (2013.01)

(58) Field of Classification Search
USPC ............................................. 244/11, 22, 72
See application file for complete search history.

(56) References Cited

U.S. PATENT DOCUMENTS

| | | | | | |
|---|---|---|---|---|---|
| 1,547,905 | A | * | 7/1925 | Crane .............................. | 244/11 |
| 1,835,630 | A | * | 12/1931 | Bowlus .......................... | 244/22 |
| 1,980,002 | A | * | 11/1934 | Savidge ......................... | 244/11 |
| 2,077,798 | A | * | 4/1937 | Jelalian .......................... | 244/11 |
| 2,418,569 | A | * | 4/1947 | Baumann ....................... | 244/22 |
| 3,111,928 | A | * | 11/1963 | Schmidt .......................... | 416/9 |
| 4,139,171 | A | * | 2/1979 | Harris ............................ | 244/22 |
| 4,155,195 | A | * | 5/1979 | Leigh-Hunt .................... | 446/35 |
| 4,326,381 | A | * | 4/1982 | Jensen ....................... | 60/641.14 |
| 4,401,103 | A | * | 8/1983 | Thompson .................... | 126/605 |
| 4,414,814 | A | * | 11/1983 | White ............................. | 60/682 |
| 5,337,563 | A | | 8/1994 | Weber | |

(Continued)

FOREIGN PATENT DOCUMENTS

| | | |
|---|---|---|
| DE | 893 894 | 10/1958 |
| DE | 30 23 948 | 1/1982 |

(Continued)

OTHER PUBLICATIONS

U.S. Appl. No. 13/724,554, filed Dec. 21, 2012.

(Continued)

*Primary Examiner* — Christopher P Ellis
*Assistant Examiner* — Medhat Badawi
(74) *Attorney, Agent, or Firm* — Greenblum & Bernstein, P.L.C.

(57) ABSTRACT

Aircraft with an emission-free drive and method for emission-free driving of an aircraft. The aircraft includes a drive device, having a flapping wing device, structured and arranged to generate thrust, a lift device structured and arranged to generate lift, and a heat engine, having at least one flat-plate Stirling engine drivable by solar thermal radiation, structured and arranged to convert thermal energy into kinetic energy to drive the drive device. The flapping wing device includes at least one flapping wing, which is pivotable transverse to a flight direction.

20 Claims, 12 Drawing Sheets

(56) References Cited

U.S. PATENT DOCUMENTS

| | | | | |
|---|---|---|---|---|
| 5,518,205 | A * | 5/1996 | Wurst et al. | 244/58 |
| 6,700,054 | B2 * | 3/2004 | Cherney et al. | 136/246 |
| 6,775,982 | B1 * | 8/2004 | Kitamura et al. | 60/641.8 |
| 7,810,325 | B2 * | 10/2010 | Bennett | 60/517 |
| 8,621,867 | B2 * | 1/2014 | Galbraith | 60/641.8 |
| 2004/0038089 | A1 * | 2/2004 | Hoffjann et al. | 429/12 |
| 2004/0078121 | A1 * | 4/2004 | Cartmell et al. | 701/3 |
| 2004/0083729 | A1 * | 5/2004 | Teacherson | 60/517 |
| 2005/0242232 | A1 * | 11/2005 | Bennett | 244/53 R |
| 2007/0209365 | A1 * | 9/2007 | Hamer et al. | 60/648 |
| 2007/0227138 | A1 * | 10/2007 | Carrott | 60/520 |
| 2008/0121755 | A1 * | 5/2008 | Bennett | 244/59 |
| 2009/0058089 | A1 * | 3/2009 | Foucault et al. | 290/52 |
| 2009/0313994 | A1 * | 12/2009 | Bennett | 60/641.8 |
| 2010/0107633 | A1 * | 5/2010 | Tsao | 60/641.8 |
| 2012/0125001 | A1 | 5/2012 | Ittner | |
| 2012/0227389 | A1 * | 9/2012 | Hinderks | 60/317 |
| 2013/0031899 | A1 * | 2/2013 | Budliger et al. | 60/520 |
| 2013/0042626 | A1 * | 2/2013 | Johnston | 60/780 |
| 2013/0220656 | A1 * | 8/2013 | Schwarz et al. | 173/114 |
| 2013/0263597 | A1 * | 10/2013 | Chauvin | 60/644.1 |
| 2013/0320133 | A1 * | 12/2013 | Ratti et al. | 244/22 |
| 2014/0182282 | A1 * | 7/2014 | Kamen et al. | 60/517 |

FOREIGN PATENT DOCUMENTS

| | | |
|---|---|---|
| DE | 36 08 991 | 9/1987 |
| DE | 42 16 839 | 5/1992 |
| DE | 10 2009 016 200 | 10/2010 |
| EP | 2 258 947 | 12/2010 |
| WO | 96/06274 | 2/1996 |
| WO | 2008/121774 | 10/2008 |

OTHER PUBLICATIONS

European Office Action conducted in counterpart European Appln. No. 10 2011 122 071.6 (Apr. 8, 2013) (w/ Machine translation).

"*solarstirling*," presentation downloaded from of www.solarstirling. at (at least May 17, 2009).

* cited by examiner

STIRLING ENGINE WITH FLAPPING WING FOR AN EMISSION-FREE AIRCRAFT

CROSS-REFERENCE TO RELATED APPLICATIONS

The present application claims priority under 35 U.S.C. §119(a) of German Patent Application No. 10 2011 122 071.6 filed Dec. 22, 2011, the disclosure of which is expressly incorporated by reference herein in its entirety.

BACKGROUND OF THE INVENTION

1. Field of the Invention

The present invention relates to emission-free flying, to an aircraft with an emission-free drive, and to a method for driving an aircraft.

2. Discussion of Background Information

Aircraft, e.g., airplanes, have a drive device, e.g., one or more propellers, for the forward movement of the aircraft. The drive takes place by an internal combustion engine. Moreover, turbines can also be used as a drive device, which is likewise based on the combustion of fuel. Due to the generally acknowledged topic of global warming, however, consideration is increasingly being given to operating an airplane emission-free as far as possible, or at least with a reduced $CO_2$ discharge. With the use of electric motors, however, batteries necessary for operating an emission-free airplane are not yet available according to the known prior art. However, there are small flight demonstrators, such as, e.g., the electric flying Cri-Cri from EADS, which have demonstrated the feasibility in principle of electric flight with small airplanes. Furthermore, there are solar airplanes, such as the Solarimpuls, which also render a night flight possible by converting solar energy into electric current by solar cells during the day and storing it in batteries, which can then drive an electric motor at night. However, the solar cells are associated with high costs.

There is therefore a need for aircraft with the lightest possible drive with a reduced $CO_2$ discharge based on the operation.

SUMMARY OF THE EMBODIMENTS

Embodiments of the invention are directed to an aircraft with an emission-free drive that includes a drive device for generating a thrust, a lift device for generating a lift, and a heat engine for converting thermal energy into kinetic energy for driving the drive device. The drive device has a flapping wing device for a thrust generation, with at least one flapping wing, which can pivot transverse to the flight direction. The flapping wing is held by a holding device so that it can pivot around a pivot axis running transverse to the flight direction. At least one flat-plate Stirling engine that can be driven by solar thermal radiation as a heat engine, which includes a displacer arranged in a movable manner in a working chamber with a changeable working volume, and a working piston connected to the working chamber for changing the working volume. The working piston is coupled to a support device of the holding device via a primary transmission device in such a way that a linear movement of the working piston causes a pivoting of the first flapping wing. The displacer is coupled to an adjustable kinematics of the holding device via a secondary transmission device in such a way that a turnover of the flapping wing controls the displacer in proper phase. Moreover, embodiments are directed to a method for driving an aircraft that includes feeding of solar thermal energy to a flat-plate Stirling engine, conversion of the thermal energy into kinetic energy by means of the flat-plate Stirling engine; and driving a drive device by the flat-plate Stirling engine.

According to a first aspect of the invention, an aircraft with an emission-free drive is provided, which has a drive device for generating a thrust, a lift device for generating a lift and a heat engine for converting thermal energy into kinetic energy for driving the drive device. For generating thrust, the drive device has a flapping wing device with at least one flapping wing that can pivot transverse to the direction of flight. The flapping wing is held with a holding device so that it can pivot around a pivot axis running transverse to the direction of flight. At least one flat-plate Stirling engine is provided as a heat engine, which engine can be driven by solar thermal radiation, and which has a displacer arranged movably in a working chamber with a changeable working volume, and a working piston connected to the working chamber for changing the working volume. The working piston is coupled to a bearing device of the holding device via a primary transmission device in such a way that a linear movement of the working piston causes a pivoting of the first flapping wing. The displacer is coupled to an adjustable kinematics of the holding device via a secondary transmission device in such a way that a turnover of the flapping wing controls the displacer in proper phase.

The coupled control has a phase shift of approx. 90°.

The at least one flapping wing runs transverse to the direction of flight and with a movement transverse to the direction of flight, generates a thrust in the direction of the flight direction.

The working chamber has a changeable working volume and is filled with a working gas, and a regenerator is arranged in the working chamber for collecting and delivering thermal energy contained in the working gas.

A "flat-plate Stirling engine" is a Stirling engine that includes a displacer with intermittent control. The displacer operates with very low temperature difference, which is also due to the fact that the system of the flat plate has a larger heat transfer surface in proportion to the working volume. A surface also referred to as front wall can be heated, according to the present invention, in particular by solar insolation. Flat-plate Stirling engines are suitable for converting thermal energy, which is provided by the solar thermal radiation, into kinetic energy. Flat-plate Stirling engines can be driven at low temperature differences, e.g., at a temperature difference of approximately 15°. Due to their active principle, flat-plate Stirling engines can be realized with relatively light components. Due to the use of the solar thermal radiation as a heat source, which is unavoidable for the operation of the flat-plate Stirling engine, an emission-free drive, i.e., a drive with reduced $CO_2$ discharge is possible.

The term "aircraft" comprises airplanes and in particular also manned and unmanned airplanes. "Aircraft" is also understood to mean airships as well as balloon vehicles.

The lift device comprises, for example, a body filled with a lift-generating fluid of an airship or a balloon vehicle.

The lift device can also comprise a wing device with an airfoil section for generating a lift (with correspondingly simultaneous thrust to generate the necessary flow). The term "wing device" can also comprise, for example, the lift devices embodied or formed integrally with a fuselage construction in the case of all-wing airplanes.

According to the invention, several flat-plate Stirling engines can be provided, e.g., based on the flight direction next to one another or one behind the other, or also arranged distributed at several points.

According to one exemplary embodiment of the invention, the lift device comprises a wing device with an airfoil section for producing a lift. The flat-plate Stirling engine is arranged in the wing device.

A flat-plate Stirling engine can thus be provided, which has a surface that is as large as possible exposed to solar thermal radiation. Moreover, the flat-plate Stirling engine can optimally utilize the cross-sectional geometry of the airfoil section, which is further described below.

According to an exemplary embodiment of the invention, in the flat-plate Stirling engine, the working chamber is filled with a working gas and the changeable working volume is embodied or formed between a top and an underside. The displacer is held in a moveable manner in the working chamber between the top and the underside. A regenerator is arranged in the working chamber for collecting and delivering thermal energy contained in the working gas. The working chamber is arranged in the lift device, and the working gas can be heated from a top of the lift device by the solar thermal radiation.

The alignment of the top to the solar thermal radiation results during flight operation, since the top always points upwards and thus in the direction of the solar insolation. The solar insolation, to put it simply, causes a heating of the working gas in the region above the displacer, whereby the working gas expands and presses the working piston outwards. Subsequently, a cooling takes place and thus a contraction of the working gas in the upper region and a new movement of the working piston occurs, whereupon a new step of heating and expanding begins again. In this manner, the displacer transports the working gas to and fro between the hot top and the cold underside in order to achieve a quick cooling or heating of the working gas.

The transmission device has a primary transmission device, which is coupled to the holding device, i.e., the supporting arm or the supporting device, in such a way that a linear movement of the working piston causes a pivoting of the first flapping wing. The transmission device also has a secondary transmission device that is coupled to the variable kinematics of the flapping wing, i.e., variable kinematics of the holding device, in such a way that a turnover of the flapping wing controls the displacer in proper phase.

The working piston is held in a moveable manner in a working cavity. The working piston represents a moveable wall surface of the working chamber.

According to a further exemplary embodiment of the invention, the working chamber is embodied or formed between the top of the wing and the underside of the wing. The displacer divides the working chamber into a first and a second chamber region. The displacer is embodied or formed such that, with movement, it displaces working gas from the one into the other chamber region. The top of the wing forms a first side of the flat-plate Stirling engine with a first temperature and the underside of the wing forms a second side of the flat-plate Stirling engine with a second temperature. The second temperature is lower than the first temperature.

The first chamber region is an upper chamber region and the second chamber region is a lower chamber region.

The working gas can be coolable, i.e., cooled from an underside of the lift device, e.g., on the underside of the wing. The wing device can have a heat-conducting chamber wall in the region of the working chamber, e.g., an aluminum sheet, e.g. in the region of the working chamber on the underside.

The first side forms a hot side and the second side forms a cold side of the flat-plate Stirling engine.

With movement of the displacer, working gas flows through the regenerator. This is embodied or formed such that, when flowed through with the working gas, thermal energy contained in the working gas is delivered or collected.

In the front region of the airfoil profile, i.e., towards the nose edge, a wall running between the top of the wing and the underside of the wing can be provided, which closes the working chamber with respect to a front region.

The flat-plate Stirling engine can be used for wing statics, i.e., incorporated into the support structure of a wing in a supporting manner.

The support airfoil profile can have a leading edge and a trailing edge. The displacer is held in a pivotable manner in the region of the trailing edge and the displacer forms a plate curved in the direction of the airfoil profile.

The displacer can have, for example, a fiberboard with heat insulation property, which has a dark color on the top, e.g., a foam board.

According to a further embodiment of the invention, the lift device in the region of the working chamber on the top has a light-transmitting cover in order to render possible a direct heat radiation into the working chamber.

The cover or outer skin of the wing device forms a chamber wall in the region of the working chamber, whereby fewer components result in total.

According to a further embodiment of the invention, a power-generating device for generating electric energy for driving the aircraft is provided.

According to a further embodiment of the invention, the power-generating device has a generator device for converting kinetic energy into electric energy. The generator device can be driven by the flat-plate Stirling engine. The generator device is, for example, a linear generator which converts the linear movement of the working piston into electric energy.

According to a further embodiment of the invention, the power-generating device has photovoltaic elements for converting solar radiation into electric energy.

According to an exemplary embodiment of the invention, the photovoltaic elements are arranged on the top of the displacer.

The photovoltaic elements can be arranged, for example, in regions on the top of the aircraft.

According to an embodiment of the invention, the power-generating device has a fuel cell device, which feeds the heat released with the operation of a fuel cell to the working chamber of the flat-plate Stirling engine.

According to an embodiment of the invention, a heating device for heating the working gas is provided in one of the two chamber regions of the working chamber of the flat-plate Stirling engine.

A support of the flat-plate Stirling engine operation can be provided, for example, when the solar thermal radiation is present only in a reduced manner, or the input of thermal energy also the solar thermal radiation can also be replaced by the heating device, for example, when no solar thermal radiation is present, such as during a night flight, for example.

The heating device can have, for example, a combustion device operated with a fuel, wherein a storage device can be provided to store the fuel.

For example, the fuel used can be obtained from sustainable raw materials in order to provide a flight operation that is as $CO_2$-reduced or $CO_2$-neutral as possible.

The heating device can also have in particular an electric heating device for converting electric energy into thermal energy.

According to an embodiment of the invention, the heating device has an electric heating device for converting electric energy into thermal energy. The electric heating device is integrally embodied or formed in the displacer.

For example, the electric heating device is a heating coil that is arranged in one of the two chamber regions in order to heat the working gas in this region.

The electric heating device can be embodied or formed, for example, as a heating surface of the displacer that is operated electrically.

The storage and delivery of the electric energy by the storage device can take place at different phases.

According to an embodiment of the invention, a storage device for storing and delivering the electric energy generated by the power-generating device is provided. The power-generating device feeds electric energy to the storage device. The storage device stores the fed electric energy and makes it available for driving the aircraft, while heat is fed to the flat-plate Stirling engine.

The storage device can deliver the electric energy, for example, to the electric heating device.

According to a further example of the invention, the flat-plate Stirling engine is provided combined with photovoltaic elements and a battery, as well as with a heating device, which can be operated with the electric energy stored in the battery.

According to a further example of the invention, the flat-plate Stirling engine is combined with a generator in order to be able to charge a battery with which again during nighttime hours for example a heating device can be operated.

According to a further example of the invention, the flat-plate Stirling engine is embodied or formed combined with a heating device, which is operated with a fuel, in order for example to support the operation of the flat-plate Stirling engine during the day or also to render possible the operation of the flat-plate Stirling engine at night for the first time at all.

According to a further example of the invention, the flat-plate Stirling engine is combined with photovoltaic elements with which a heating device is operated that supports the operation of the flat-plate Stirling engine.

For example, the flat-plate Stirling engine (FSM) is provided in combination with the following components:

FSM+photovoltaic elements+heating device;

FSM+photovoltaic elements+battery+electric heating device;

FSM+generator+battery+electric heating device; and

FSM+heating device, operated with fuel.

According to a further aspect of the invention, the flat-plate Stirling engine is combined with the cited elements of energy conversion and energy storage in order, for example, to temporarily achieve a particularly high flying speed.

According to a second aspect of the invention, a method for driving an aircraft is provided that comprises:
a) Feeding of solar thermal energy to a flat-plate Stirling engine;
b) Conversion of the thermal energy into kinetic energy by the flat-plate Stirling engine; and
c) Driving a drive device by means of the flat-plate Stirling engine, wherein the drive device has a flapping wing device for a thrust generation, with at least one flapping wing, which can pivot transverse to the direction of flight. The flapping wing is held with a holding device so that it can pivot around a pivot axis running transverse to the direction of flight. The flat-plate Stirling engine has a displacer arranged in a movable manner in a working chamber with a changeable working volume, and a working piston connected to the working chamber for changing the working volume. The working piston is coupled to a support device of the holding device via a primary transmission device in such a way that a linear movement of the working piston causes a pivoting of the first flapping wing. The displacer is coupled to an adjustable kinematics of the holding device of the flapping wing via a secondary transmission device in such a way that a turnover of the flapping wing controls the displacer in proper phase.

According to an embodiment of the invention it is provided that:
i) In a first phase kinetic energy of the flat-plate Stirling engine is converted into electric energy and is stored as electric energy; and
ii) In a second phase the stored electric energy is converted into thermal energy in an electric heating device and drives the Stirling engine in order to provide the kinetic energy for driving the drive device.

The first phase is provided for example with existing solar thermal radiation and the second phase with reduced or non-existent solar thermal radiation, for example, at night.

According to a third aspect of the invention the use of a flat-plate Stirling engine in an aircraft, in particular an airplane, is also provided.

According to an aspect of the invention, a flat-plate Stirling engine is placed in an aircraft in order to provide the drive energy for generating the thrust, wherein the solar thermal radiation is utilized as energy source for the operation of the flat-plate Stirling engine, which represents a heat engine. The flat-plate Stirling engine, which at first generates a linear movement with its working piston, is advantageously combined with flapping wings, in which the movement in the form of a to and fro movement, i.e., in a certain sense a linear movement, even though along the path of an arc due to the pivot movement. The dynamics of the flat-plate Stirling engine, which in its movement has just the same dead or (max./min.) reversal points as the flapping wing, are thereby combined in an offset phase manner in such a way that respectively the one mechanism helps the other mechanism over this point. Due to its possible lightweight design, the flat-plate Stirling engine can be connected well to the other boundary conditions of an aircraft, for example, of an airplane. In addition to the parameter of weight, here in particular the necessary installation space also plays a decisive role as a second parameter. Since the flat-plate Stirling engine when operated with solar thermal radiation should also be exposed to the solar thermal radiation over as large a surface as possible, the flat-plate Stirling engine can be integrated in the region of the enveloping surfaces pointing upwards, wherein the flat design means only a negligible restriction of the usable volume. For example, the flat-plate Stirling engine can be inserted in the upper region of an airplane fuselage without too much installation space being lost therewith in the interior, for example, of a passenger cabin. A particularly efficient arrangement can be achieved thereby in that the flat-plate Stirling engine is installed in the wing or wings in an integrated manner, since the wings to generate lift always have a wing geometry that inevitably encloses a certain volume. This wing volume, which is used, for example, to accommodate fuel tanks, can therefore be used well for the accommodation of a flat-plate Stirling engine, which after all replaces the normal operation with fossil fuels such as kerosene. In order to provide an operation of the flat-plate Stirling engine, i.e. an operation of the aircraft, for example an airplane, even when the solar thermal radiation is reduced or is not even present at all, it is provided according to one aspect of the invention to provide additional energy sources by means of energy storage devices in these operating phases, in order to generate the thrust for the operation of the aircraft. If, for example, the solar energy available during the day is used in the case of the energy storage and, for example, electric energy is stored by means of photovoltaic elements, an overall emission-free flight operation can be provided therewith. An emission-free flight operation is likewise possible when a generator is operated in addition to the thrust device by means of the Stirling engine during the day, in order to generate electric energy, which then is stored in an energy storage, such as a battery device, for example, in order to provide this at night in order to generate thermal energy which is then available to the flat-plate Stirling engine for operation. A further possibility for ensuring an emission-free operation also lies in that as an additional energy source, for example, for supplying thermal energy to the flat-plate Stirling engine, in order to also be able to operate it at night, sustainable raw materials are provided or also hydrogen generated by means of regenerative energy sources, which can be used in the operation of a fuel cell.

It should be pointed out that the features of the embodiments and aspects of the devices also apply to embodiments of the method as well as use of the device and vice versa. Moreover those features in which this is not explicitly mentioned can also be combined freely with one another.

Embodiments of the invention are directed to an aircraft with an emission-free drive. The aircraft includes a drive device, having a flapping wing device, structured and arranged to generate thrust, a lift device structured and arranged to generate lift, and a heat engine, having at least one flat-plate Stirling engine drivable by solar thermal radiation, structured and arranged to convert thermal energy into kinetic energy to drive the drive device. The flapping wing device includes at least one flapping wing, which is pivotable transverse to a flight direction, According to embodiments, the drive device can further include a holding device structured and arranged to hold the at least one flapping wing to be pivotable around a pivot axis running transverse to the flight direction, and the at least one Stirling engine may include a working chamber with a changeable working volume, a displacer structured and arranged to be movable manner in the working chamber, and a working piston connected to change the working volume of the working chamber. The holding device can further include a support device and the aircraft may further include a primary transmission device structured and arranged to couple the working piston to the support device so that linear movement of the working piston produces a pivoting of the at least one flapping wing. The holding device can further include adjustable kinematics and the aircraft may further include a secondary transmission device structured and arranged to couple the displacer to the adjustable kinematics so that a turnover of the flapping wing controls the displacer in proper phase. The lift device may include a wing device with a support airfoil profile that is structured and arranged to generate the lift, and the flat-plate Stirling engine can be arranged in the wing device.

In accordance with further embodiments of the instant invention, the working chamber can be fillable with a working gas and the changeable working volume can have a top and an underside, and the displacer may be structured and arranged to be movable between the top and the underside. Moreover, a regenerator can be structured and arranged in the working chamber to collect and deliver thermal energy contained in the working gas, and the working chamber may be arranged in the lift device and the working gas may be heatable from a top of the lift device by solar insolation. The working chamber can be arranged between a wing top and a wing underside, and the displacer may be arranged to divide the working chamber into a first and a second chamber region and, with movement, to displace the working gas from one of the first and second chamber region into the other of the first and second chamber region. A top of the wing can form a first side of the flat-plate Stirling engine with a first temperature and the underside of the wing can form a second side of the flat-plate Stirling engine with a second temperature. The second temperature may be lower than the first temperature. Further a heating device can be structured and arranged to heat the working gas in one of the first and second chamber regions. The heating device may include an electric heating device integrally embodied in the displacer that can be structured and arranged to convert electric energy into thermal energy.

According to other embodiments, the lift device can include a light-transmitting cover arranged in the top region of the working chamber In still other embodiments, a power-generating device can be structured and arranged to generate electric energy to drive the aircraft. The power-generating device can include a generator device structured and arranged to convert kinetic energy into electric energy and may be driven by the flat-plate Stirling engine. The power-generating device can include photovoltaic elements structured and arranged to convert solar radiation into electric energy. Further, the photovoltaic elements may be arranged on the top of the displacer. The power-generating device may include a fuel cell device and heat released with the operation of a fuel cell of the fuel cell device can be fed to the working chamber of the flat-plate Stirling engine. A storage device may be structured and arranged to store and deliver electric energy generated by the power-generating device. The power-generating device can be structured and arranged to feed electric energy to the storage device and the storage device may be structured and arranged to store the fed electric energy and to make the stored electric energy available for driving the aircraft.

Embodiments of the invention are directed to a method for the emission-free driving of an aircraft. The method includes receiving solar thermal energy to a flat-plate Stirling engine, converting the thermal energy into kinetic energy via the flat-plate Stirling engine, and driving, via the flat-plate Stirling engine, a drive device having a flapping wing device for thrust.

In embodiments, the method can include, in a first phase, converting kinetic energy of the flat-plate Stirling engine into electric energy and storing the electric energy, and in a second phase, converting the stored electric energy into thermal energy in an electric heating device, and driving the Stirling engine to provide the kinetic energy for driving the drive device.

Embodiments of the invention are directed to an aircraft with at least one heat engine arranged in at least one of a wing and a fuselage to drive a flapping wing drive. The aircraft includes a working chamber, having a top and an underside filled with a working gas, being located in the at least of the wing and fuselage, a displacer structured and arranged for movement between the top and the underside of the working chamber to a define a first and a second chamber region, and a working piston structured and arranged to adjust a working volume of the working chamber through a linear movement. The linear movement of the working piston pivotably drives at least one flapping wing of the flapping wing drive.

According to embodiments of the invention, the heat engine can include a flat-plate Stirling engine.

In accordance with still yet other embodiments of the present invention, an electric heating device can be one of integral with and coupled to the displacer to heat the working gas.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2b illustrates a section of the vertical section according to FIG. 2a;

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
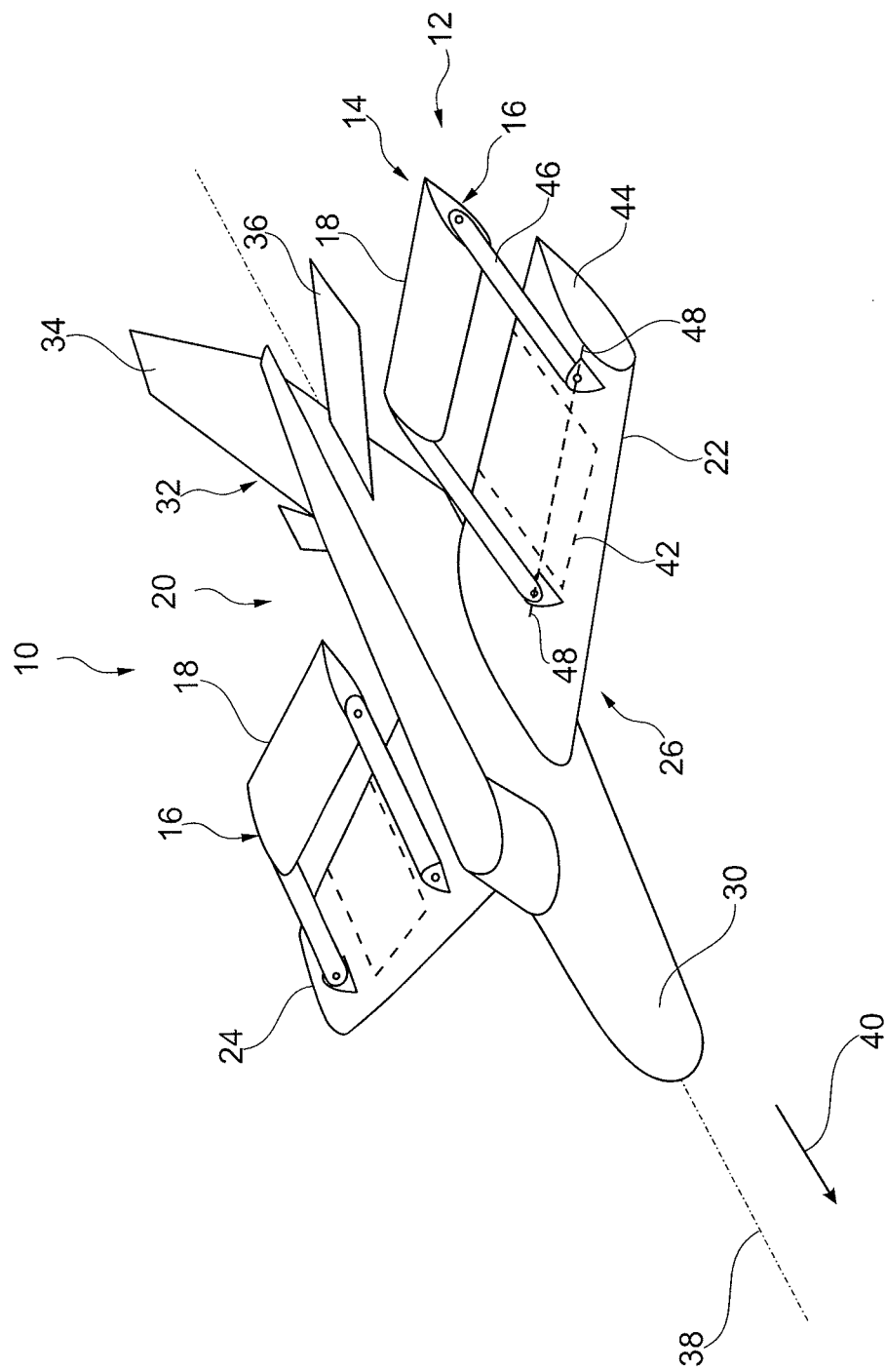
FIG. 1 illustrates an aircraft with an emission-free drive according to an exemplary embodiment of the present invention.

FIG. 1 shows a first example of an aircraft 10 with an emission-free drive 12, which is explained in more detail in the following Figures. The aircraft 10 has a drive device 14 for generating a thrust. The drive device has a flapping wing device 16 with at least one first flapping wing 18, which runs transverse to the direction of flight. Moreover, the aircraft 10 has a lift device 20 for generating a lift, for example, in the form of two lateral wings 22, 24.

Furthermore, a heat engine 26, not shown in detail, is arranged to convert thermal energy into kinetic energy for driving the drive device 14. To this end according to the present invention at least one flat-plate Stirling engine 28 is provided as a motor, which can be driven by solar thermal radiation (not shown in detail in FIG. 1, see following Figures).

The aircraft 10 is, for example, an airplane, which can be a manned or unmanned airplane. In other embodiments, aircraft 10 can be, e.g., an airship, which is not shown in detail.

FIG. 1 shows by way of example an airplane 10, e.g., a manned airplane, that has an airplane tip 30 and a tail region 32. A tailplane 34 and an elevator unit 36 are indicated in the tail region 32. A dashed line 38 designates a longitudinal axis of the airplane, and a direction arrow 40 shows the flight direction.

Instead of the two flapping wings 18, in other embodiments, airplane 10 can be provided with another number of flapping wings and/or a different arrangement or embodiment of the flapping wings 18. With an all-wing airplane, a single flapping wing can also be provided. Moreover, it should be noted that a single flat-plate Stirling engine 28 can be provided to drive several flapping wings, or one flapping wing can also be driven by several flat-plate Stirling engines 28.

The flapping wings 18 are respectively held with a holding device 46 so that they can pivot around a pivot axis 48 running transverse to the direction of flight 40. The pivot axis 48 is shown in the Figures; it can also lie within the wing volume, or at other locations. The pivot axis 48 runs transverse to the direction of flight 40, which can mean, e.g., at a 90° angle to the direction of flight 40, or at some other angle. The flapping wing 18 has for example a longitudinally oriented shape that is arranged transverse to the direction of flight 40.

In FIG. 1, a dashed line 42 represents the flat-plate Stirling engine 28 integrated into the lift device 20. In other words, the lift device 20 comprises a wing device, i.e. the wings 24, 26 with a support airfoil profile 44 for generating the lift. The wings 24, 26 also serve to accommodate the at least one flat-plate Stirling engine 28.

In other embodiments, the flat-plate Stirling engine 28 can be arranged at a different location, for example, in the fuselage region, which may require a corresponding power transmission device to the flapping wing or wings 18.

Figure 2A:
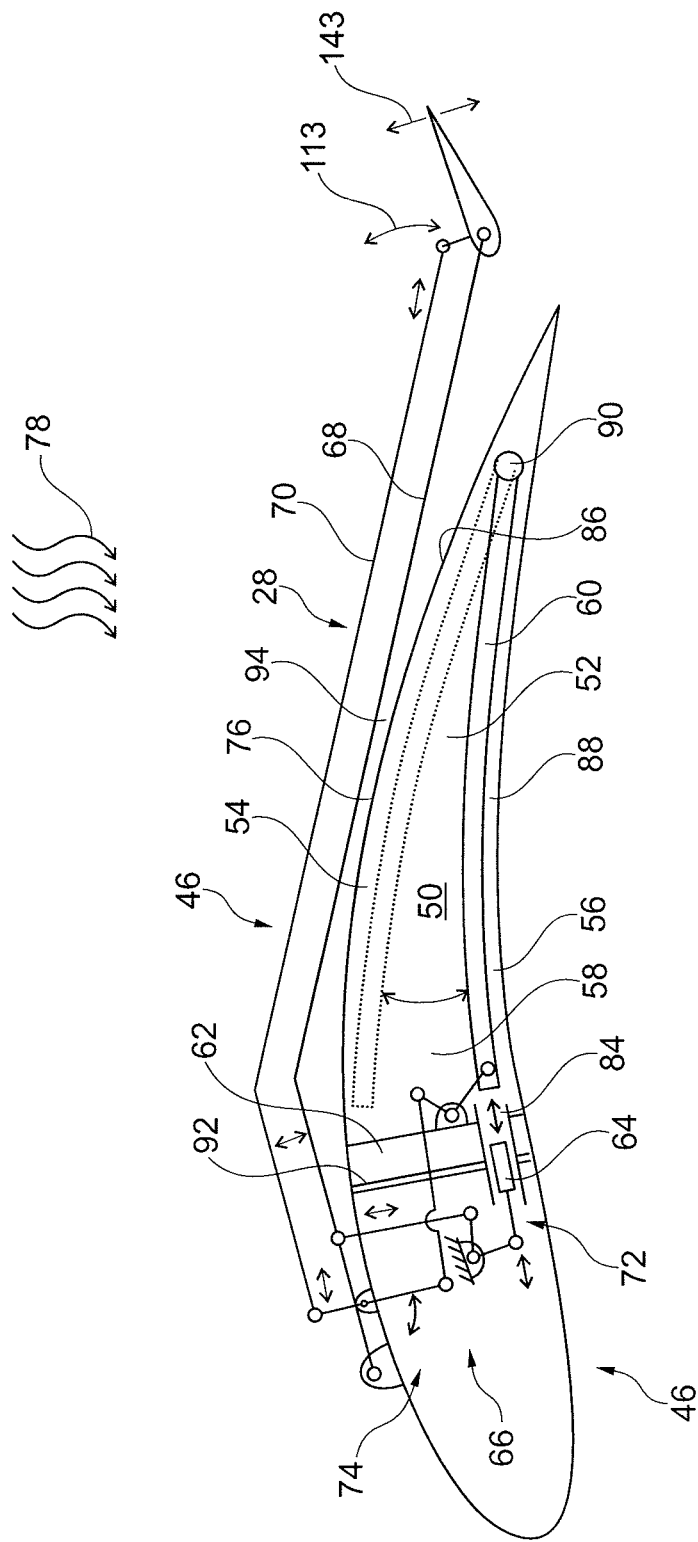
FIG. 2a illustrates a diagrammatic vertical section through a wing of the aircraft according to FIG. 1.
Figure 2B:
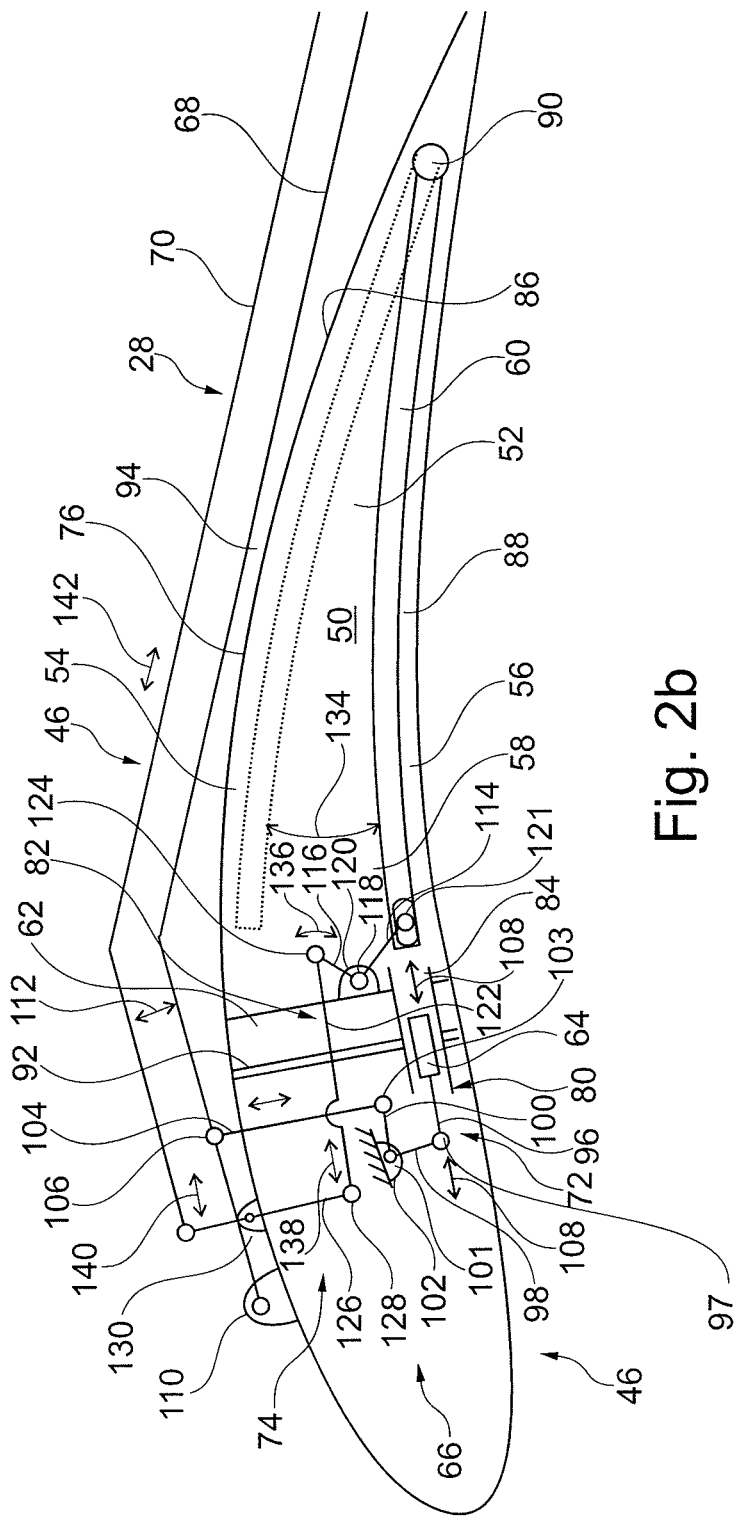

The flat-plate Stirling engine 28 is explained in more detail below based on FIG. 2a and FIG. 2b. In FIG. 2a and FIG. 2b, the flat-plate Stirling engine 28 is accommodated in the wing device 16, but the flat-plate Stirling engine 28 can also be provided at other locations, such as, e.g., in the upper or lower fuselage region or also in the front region of the airplane 10.

The flat-plate Stirling engine 28 has a working chamber 52 filled with a working gas 50, with a top 54 and an underside 56 and a changeable working volume 58. Moreover, a displacer 60 is held in the working chamber 52 so that it can move between the top 54 and the underside 56. Furthermore, a regenerator 62 is arranged in the working chamber 52 for collecting and delivering thermal energy contained in the working gas 50. Furthermore, a working piston 64 is connected to the working chamber 52. The working piston 64 is used to change the working volume 58.

Furthermore, a transmission device 66 is arranged to couple the displacer 60 and the working piston 64 to the flapping wing device 16 in a power-transmitting manner. The holding device 46 has a pivoting support device 68, e.g., a support arm, and an adjustable kinematics 70. The transmission device 66 has a primary transmission device 72, which is coupled to the holding device 46, i.e., the support device 68, in such a way that a linear movement of the working piston 64 causes a pivoting of the first flapping wing. The transmission device 66 also has a secondary transmission device 74 that is coupled to the adjustable kinematics 70 of the holding device 46 in such a way that a turnover of the flapping wing controls the displacer 60 in proper phase.

The working chamber 52 is arranged in the lift device 20, and the working gas 50 can be heated by the solar thermal radiation from a top 76 of the lift device 20, which is indicated symbolically by arrows 78.

As can be seen in FIG. 2b, the primary transmission device 72 has a first push rod connection 80 which couples the working piston 64 to the support device 68. The secondary transmission device 74 has a second push rod connection 82, which couples the displacer 60 to the adjustable kinematics 70. Before the two push rod connections 80, 82 are described in detail, the flat-plate Stirling engine 28 will be described.

The working piston 64 is held in a moveable manner in a working cavity 84 and forms a moveable wall surface of the working chamber 52. The side walls of the working cavity 84 have at the front two mechanical stops (not shown) to limit the linear movement of the working piston 64. As indicated in FIG. 2a and FIG. 2b, the working chamber 52 is embodied or formed between a top 86 of the wing and an underside 88 of the wing. The displacer 60 divides the working chamber 52 into a first, i.e., upper chamber region and a second, i.e., lower chamber region. The displacer 60 is embodied or formed to move about a pivot point 90 to displace working gas 50 from the one chamber region into the other chamber region. The top 86 of the wing forms a first side of the flat-plate Stirling engine 28 with a first temperature, and the underside 88 of the wing forms a second side of the flat-plate Stirling engine 28 with a second temperature. The second temperature is lower than the first temperature. For example, an aluminum sheet can be provided on the underside 88 for cooling. With movement of the displacer 60, working gas 50 flows through the regenerator 62, which is sealed with respect to the front region of the wing cavity by a bulkhead 92. The bulkhead 92 forms a wall running between the top 86 of the wing and the underside 88 of the wing, which closes the working chamber 52 with respect to the front region.

The flat-plate Stirling engine 28 can be embodied or formed, for example, between adjacent rib constructions of the wing, and the bulkhead 92 can be embodied or formed in connection with a support profile running in the longitudinal direction. The flat-plate Stirling engine 28 can also be, e.g., used for wing statics or integrated into the support structure concept. According to the embodiments, several flat-plate Stirling engines 28 can be embodied or formed in the longitudinal direction of the wing, which runs transversely to the actual flight direction, i.e., the longitudinal axis 38 of the airplane.

The displacer 60 can in particular be embodied or formed as a plate bent in the direction of the wing profile, in order to be able to utilize the wing geometry optimally.

The displacer 60 can have, for example, a fiberboard with thermal insulation property, which has on the top a dark color, e.g., a foam board painted black. A sufficiently stable board material can be provided, which also has only a very low weight. The provision of a dark color on the top supports the heating up of the working gas 50 in the upper region, i.e., the upper chamber.

To this end, for example, the lift device in the region of the working chamber 52 on the top can have a light-transmitting cover 94. The light-transmitting cover 94 can be embodied or formed, for example, in a transparent or also translucent manner, the important factor being that sufficient thermal radiation can enter the region of the working chamber 52. For example, shortwave solar radiation can enter the region in order to be converted there into longwave thermal radiation.

The cover or exterior skin of the wing device can thereby also at the same time form the chamber wall in the region of the working chamber 52.

The first push rod connection 80 comprises a first segment 96, which is connected in a pivoted manner to a second segment 98 at a connection point 97. The second segment 98 is connected fixed to a third segment 100 via a connection point 101 and the connection point is pivoted on a fixed support 102. The third segment 100 is connected in a pivoted manner at its other end 103 to a fourth segment 104. The fourth segment 104 is connected movably to the support device 68 at an attachment point 106.

A linear movement of the working piston 64, as indicated with a first double arrow 108, leads to the corresponding linear movement 108 (along a pivot path around the bearing point of the first support 102) at the connection point 101. This linear movement 108 leads to a pivoting of the second and third segments 98, 100, and thus to an up and down movement of the other end 103 of the third segment 100. This movement is then transferred to the support device 68 by the fourth segment 104, which support device is pivoted on a fixed support 110, so that the linear movement of the working piston 64 leads to a pivoting movement 112 of the support device 68, and thus to a flapping movement 113 of the flapping wing (see FIG. 2a).

The second push rod connection 82 comprises a fifth segment 114, which is connected in a fixed manner to a sixth segment 116 via a connection point 118, which is pivoted on a fixed support 120. The fifth segment 114 is held in a movable manner on the displacer 60 via a shifting pivot point 121. The sixth segment 116 is connected in a pivoted manner to a seventh segment 122 at a connection point 124. The seventh segment 122 is connected in a pivoted manner to an eighth segment 126 at a further connection point 128. The eighth segment 126 is held on a further fixed support 130 so that it can pivot and is connected to the adjustable kinematics 70 via a yet further connection point 132.

The coupling of the adjustable kinematics to the displacer via the secondary transmission device is to be explained below. A movement of the flapping wing results in a control of the displacer at the stop point or dead point of the movement due to the inertia of the propeller blade. During the pivot movement of the wing arm the displacer remains more or less in its upper or lower position. Only when the dead point is reached, i.e., at the reversal of the pivot direction, does the turnover of the propeller blade cause a sudden movement of the displacer. The displacer is so to speak controlled with a sort of sawtooth curve, instead of a continuous sinusoidal control with a conventional Stirling engine with a rotating swing element; in the conventional embodiment the displacer is controlled.

A pivot movement 143 (see FIG. 2a) of the flapping wing causes a linear movement 142 of the adjustable kinematics 70. This in turn leads to a pivot movement 140 of the eighth segment 126 around the fixed support 130, so that as a result a linear movement 138 of the seventh segment 122 takes place. This leads to a pivot movement 136 of the connection point 124 and thus to a pivot movement 134 of the displacer 60.

At this point it should be noted that the transmission devices shown and their components are shown only diagrammatically for ease of explanation and any occurring transmission ratios, e.g., due to the lever arms are not taken into consideration.

Figure 3:
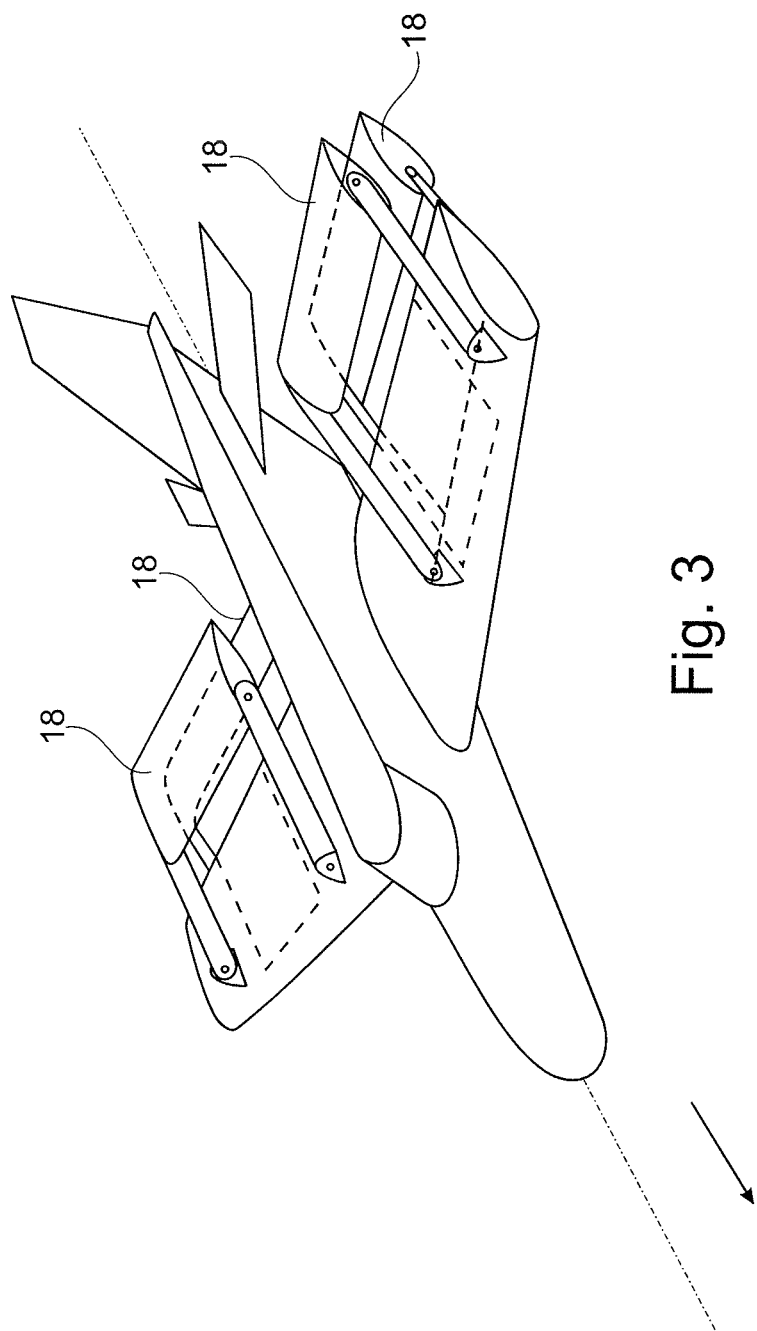
FIG. 3 illustrates a further exemplary embodiment of an aircraft according to the present invention.

According to the example shown in FIG. 3, the aircraft 10 can have several flapping wings 18, e.g., two flapping wings 18 respectively per wing, i.e., one pair of flapping wings 18 per side. In this case, relative to one side, i.e., a pair, one flapping wing can be designated as the first flapping wing and the other as the second flapping wing; correspondingly the one holding device can be designated as the first holding device and the other as the second holding device.

For example, the two flapping wings 18 are movable in opposite directions, i.e., towards and away from one another. According to an example not shown in detail, it is provided that the lift device, i.e., the actual wing, can be embodied or formed as one of the two flapping wings.

Figure 4:
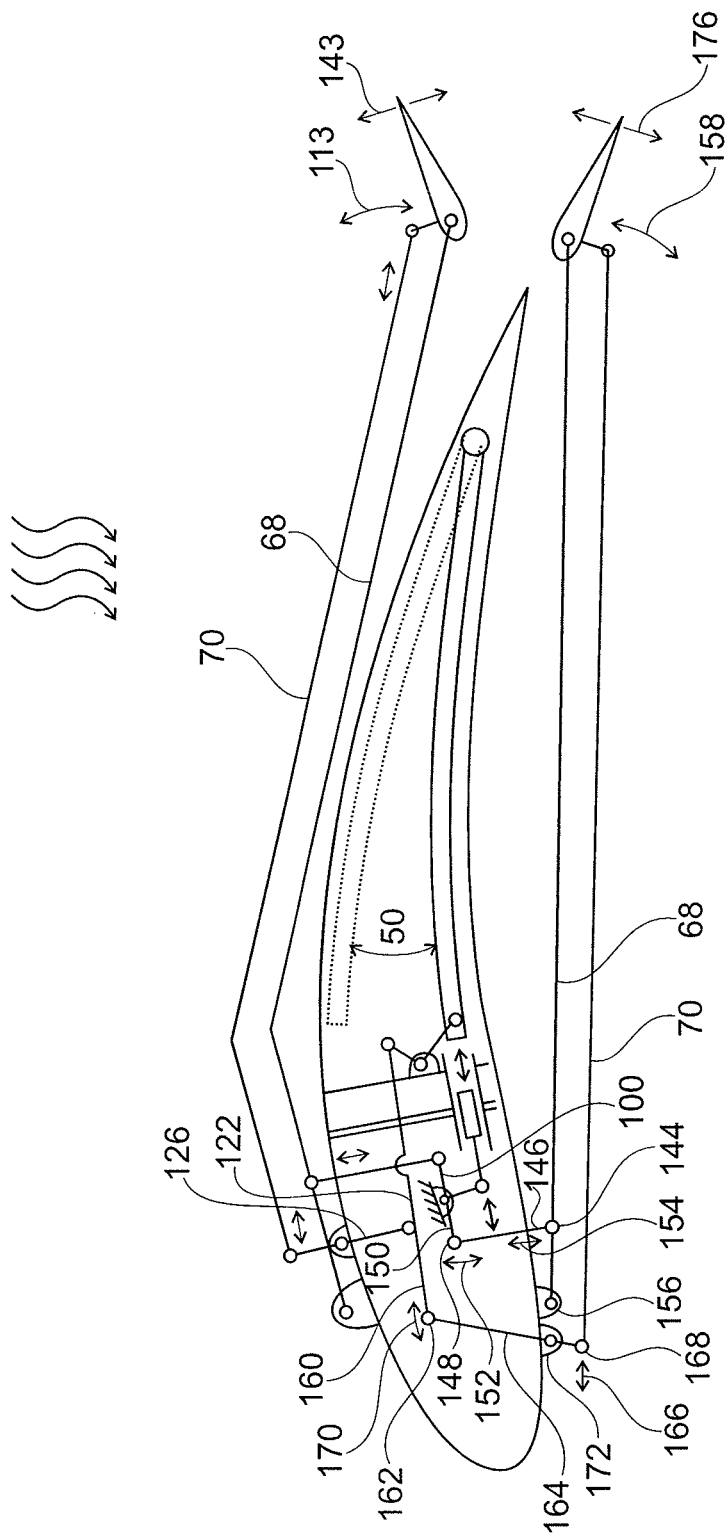
FIG. 4 illustrates a diagrammatic vertical section through a wing of the aircraft according to FIG. 3.

In FIG. 4, which is a vertical section through an exemplary embodiment of a lift device, the second flapping wing can likewise have a support device 68 and adjustable kinematics 70 and can also be driven via the flat-plate Stirling engine 28. However, it is understood that the second flapping wing can also be driven by a separate flat-plate Stirling engine.

The support device 68 of the second flapping wing is connected to a second attachment point 144 with a segment 146, which is connected in a pivoted manner to a further segment 150 via a connection point 148. The further segment 150 is an extension of the third segment 100, and is likewise connected in a fixed manner to the second segment 98 and thus also supported in a pivoted manner on the fixed support 102.

In this manner, the linear movement of the working piston 64 can cause linear movement of the segment 146 via a pivot movement 152 of the connection point 148, which then affects the support device 68 of the second flapping wing, which is pivoted on a further fixed support 156, in order to effect a flapping movement 158 of the second flapping wing, which represents a counterpart to the flapping movement 113.

To transfer the pivot movement of the displacer 60 to the adjustable kinematics 70 of the second flapping wing, the seventh segment 122 is extended with a further segment 160 and is connected in a pivoted manner to a further segment 164 via a connection point 162. The further segment 164 is held on a further fixed support 166 so that it can pivot and is connected to the adjustable kinematics 70 of the second flapping wing via a still further connection point 168.

The linear movement 138 of the seventh segment, which is achieved by the pivot movement of the displacer, causes a linear movement 170 of the connection point 162. Due to the mounting of the eighth segment 164 on the fixed support 166, this linear movement 170 causes a pivot movement 172 of the still further connection point 168, and thus leads to a linear movement 174 of the adjustable kinematics 70 of the second flapping wing, and thus causes a pivot movement 176 of the flapping wing, which represents a counterpart to the impact movement 143.

Figure 5:
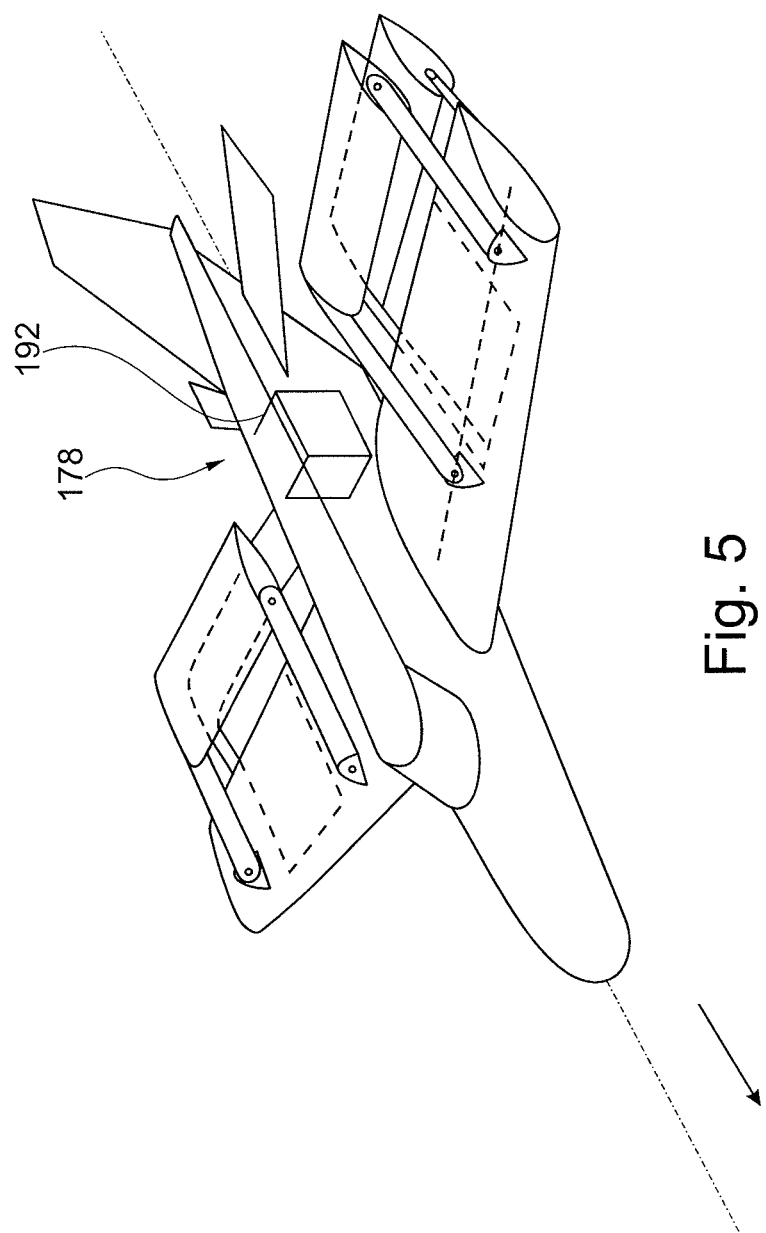
FIG. 5 illustrates a further exemplary embodiment of an aircraft according to the present invention.

FIG. 5 illustrates a further exemplary embodiment, in which a power-generating device 178, which is shown only diagrammatically, is arranged to generate electric energy for the (indirect) driving of the aircraft.

Figure 7:
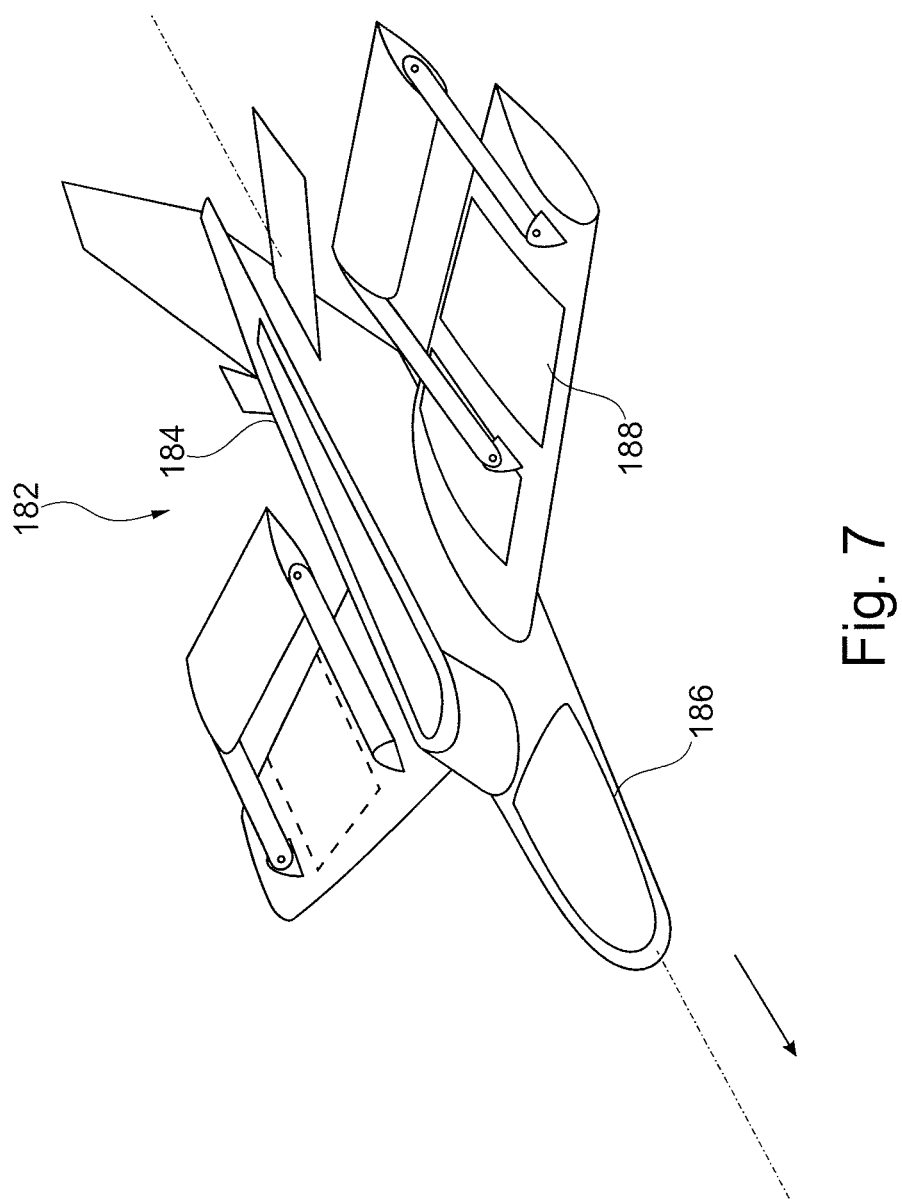
FIG. 7 illustrates a further exemplary embodiment of an aircraft according to the present invention.

It should be noted that although two flapping wings are shown in FIG. 5, the power-generating device 178 can also be provided to act with different embodiments of invention and/or different numbers of flapping wings, such as, e.g., the exemplary embodiment of FIG. 7.

Figure 6:
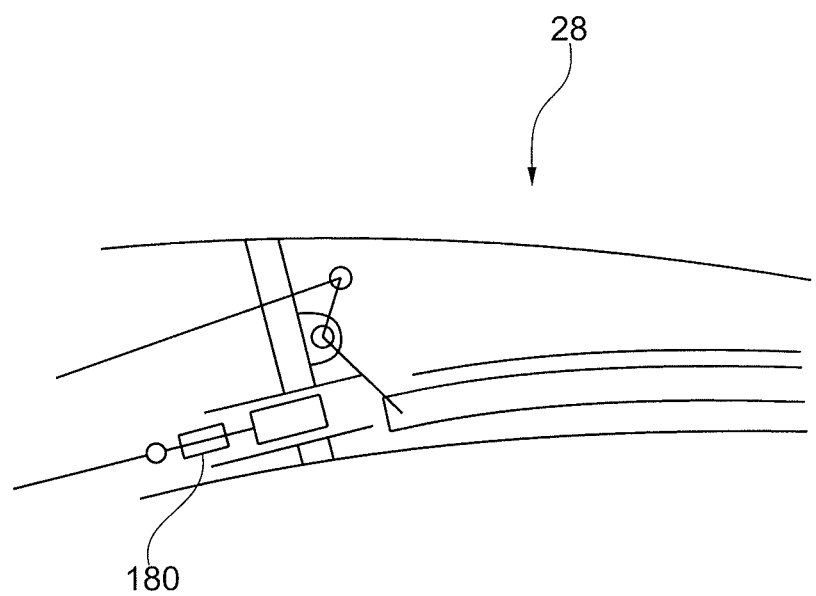
FIG. 6 illustrates a vertical section (section) through a wing of a further exemplary embodiment of a wing device according to the present invention.

For example, as shown in FIG. 6, the power-generating device 178 can comprise a generator device 180 for converting kinetic energy into electric energy. The generator device 180 is driven by the flat-plate Stirling engine 28 and can be embodied or formed as a linear generator, in order to be able to use the linear movement directly (see FIG. 6, in which one part of the further mechanism is not shown, which is also the case in FIG. 8, FIG. 9, FIG. 10, FIG. 11 and FIG. 12).

According to a further exemplary embodiment, the power-generating device 178 can have photovoltaic elements 182 for converting solar radiation into electric energy. FIG. 7 shows, for example, that the photovoltaic elements 182 can be arranged in a region of the roof construction 184 or in a region of the front airplane tip 186 and/or also in a region of the wings 188.

Figure 8:
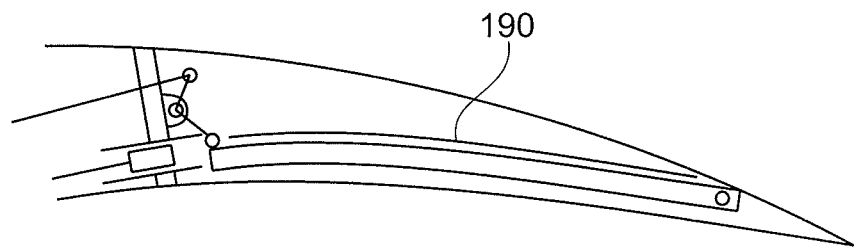
FIG. 8 illustrates a further exemplary embodiment of a wing device according to the present invention in vertical section.
Figure 9:
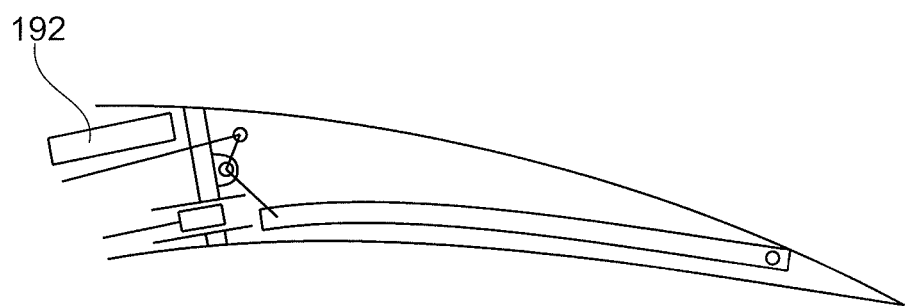
FIG. 9 illustrates a further exemplary embodiment of a wing device according to the present invention in vertical section.

According to a further exemplary embodiment, which is shown in FIG. 8, the photovoltaic elements can be arranged on the top of the displacer, which is indicated by a double line 190.

The power-generating device 178 according to a further exemplary embodiment can also have a fuel cell device 192, for example, accommodated inside the fuselage construction, as is indicated diagrammatically in FIG. 5. The fuel cell device 192 can also be arranged inside a wing construction, as is shown, e.g., in FIG. 9. It can thereby also be provided, for example, that the heat released with a fuel cell operation is fed to the working chamber of the flat-plate Stirling engine (not shown in further detail in FIG. 9).

According to a further exemplary embodiment, a heating device 194 for heating the working gas is provided in one of the two chamber regions of the working chamber of the flat-plate Stirling engine, i.e., in the hotter region of the working chamber.

Figure 10:
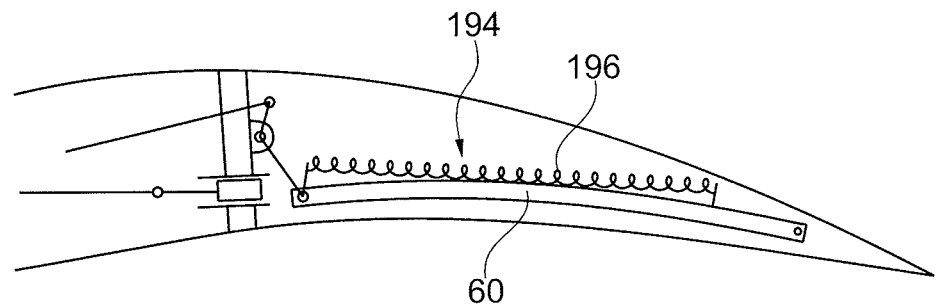
FIG. 10 illustrates a further exemplary embodiment of a wing device in vertical section with a heating device according to the present invention.

For example, the heating device 194 can include an electric heating device 196 for converting electric energy into thermal energy. The electric heating device can be embodied or formed, for example, integrally in the displacer, as is shown in FIG. 10. The heating device 194 can be a heating coil, for example, as is schematically indicated in FIG. 10, or can also be embodied or formed as a resistance layer, not shown in detail, on the displacer 60 in order to produce heat inside the working chamber by means of electric energy.

Figure 11:
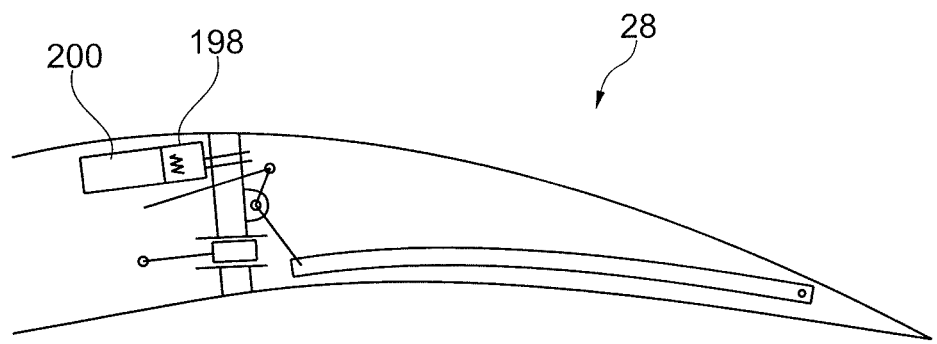
FIG. 11 illustrates a further exemplary embodiment of a wing device in vertical section with a further example of a heating device according to the present invention.

According to a further exemplary embodiment of the invention, which is shown in FIG. 11, the heating device can have a combustion device 198 operated with a fuel and additionally include a storage device 200 to store the fuel. The combustion device 198 can be provided in the immediate vicinity of the flat-plate Stirling engine 28, as is indicated in FIG. 11, or at a different location, e.g., inside the fuselage construction, in order to transport the heat from combustion device 198 to the flat-plate Stirling engine 28 (not shown in detail).

Figure 12:
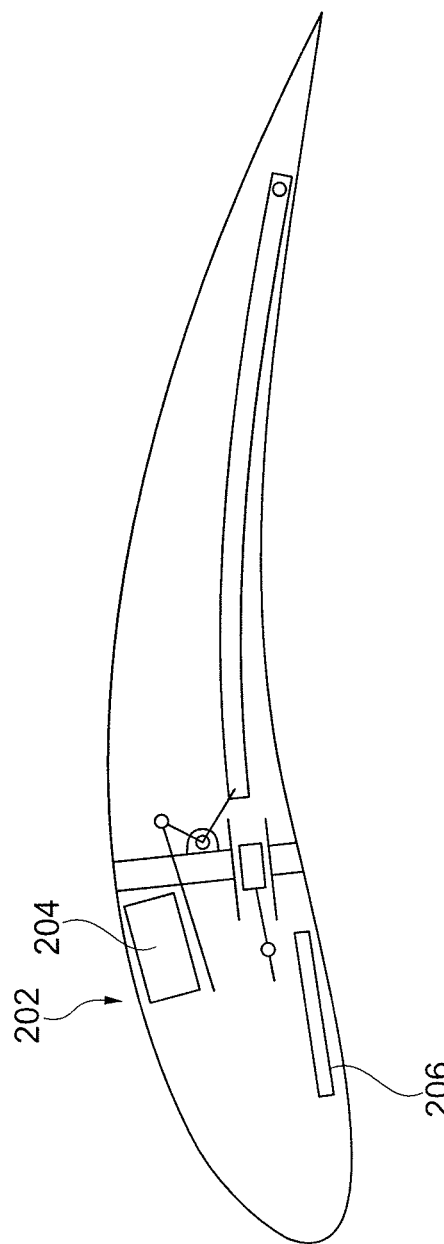
FIG. 12 illustrates a further exemplary embodiment of a wing device in vertical section according to the present invention with a storage device for storing and delivering electric energy.

In FIG. 12, a further exemplary embodiment is shown in which a storage device 202 is provided for storing and delivering the electric energy produced by the power-generating device 178. The power-generating device 178 feeds electric energy to the storage device 202, and the storage device 202 stores the fed electric energy and makes this available for the (indirect) driving of the aircraft.

FIG. 12 shows that the storage device 202 can be, for example, a battery or a battery pack, which can be accommodated at different locations inside the wing or also inside the fuselage construction (not shown in detail). By way of non-limiting example, storage device 202 can be located at a first position 204 and a second position 206. However, it is understood that other location within the wing and/or fuselage can be accommodate the storage device without departing from the spirit and scope of the embodiments.

The storage device 202, for example, delivers the electric energy to the electric heating device 194. The storage and the delivery of the electric energy via the storage device 202 can take place at different phases.

It should be noted that, while the embodiment variants described below are not illustrated in the figures, it is understood that it is within the skill of those ordinarily skilled in the art reviewing this disclosure to combine the disclosed individual components or elements into various embodiments, whether expressly described in this application or not, without departing from the scope of the invention.

According to a further embodiment variant, the flat-plate Stirling engine 28 can be combined with the photovoltaic elements 182, as well as with the battery or the storage device 202. Moreover, the electric heating device 194 may be provided in order to supply heat energy therewith to the flat-plate Stirling engine 28, for example, at night, in order to be able to operate the drive device 14, i.e. the flapping wings, with the flat-plate Stirling engine 28.

According to a further embodiment variant, the flat-plate Stirling engine 28 can be combined with the generator or the generator device 180 and the storage device 202. The stored current can then be fed to the electric heating device 194 at night in order to drive the drive device 14.

According to a further embodiment variant, the flat-plate Stirling engine 28 may be combined with the heating device or the combustion device 198, by which heat energy can be generated during the nighttime hours, which is fed to the flat-plate Stirling engine 28 in order to drive the drive device 14 with it.

According to a further embodiment variant, the flat-plate Stirling engine 28 can be combined with the photovoltaic elements 182, which during the day can drive the electric heating device 194, so that heat, in addition to the solar thermal radiation, can be made available to the flat-plate Stirling engine 28. Through the combination with the photovoltaic elements 182, surfaces of the airplane exposed to the solar insolation or the thermal radiation may be utilized optimally, and not merely those regions located immediately above the flat-plate Stirling engine working chamber.

Of course, the embodiment variants described above can also be combined with one another, in order thus to make available from the individual aspects overall a best possible utilization of the drive concept of the flat-plate Stirling engine 28.

Figure 13:
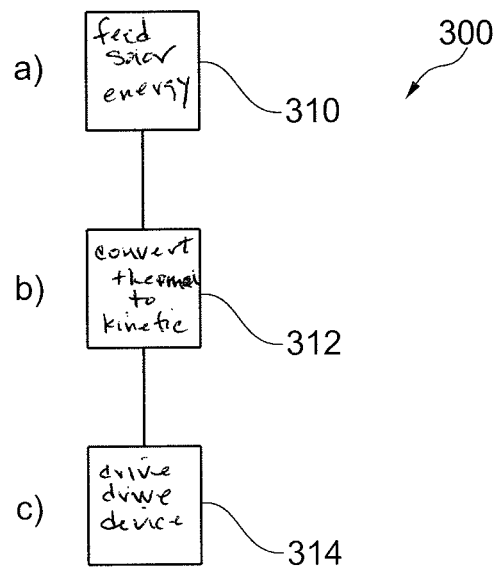
FIG. 13 illustrates process steps of a method according to the invention for driving an aircraft according to an exemplary embodiment of the present invention.

In FIG. 13, a flow diagram of an exemplary embodiment of a method 300 for driving an aircraft is depicted. According to the method 300, in a first step 310, solar thermal energy is fed to a flat-plate Stirling engine, which is structured and arranged in the aircraft as a heat engine, in order to drive a drive device for the generation of a thrust. In a second step 312, the thermal energy is converted into kinetic energy by the flat-plate Stirling engine. In a third step 314, a driving of the drive device by the flat-plate Stirling engine takes place. The drive device has a flapping wing device for generating a thrust, with at least one flapping wing that can pivot transverse to the flight direction. The flapping wing is held with a holding device so that it can pivot around a pivot axis running transverse to the flight direction. The flat-plate Stirling engine has a displacer arranged in a movable manner in a working chamber with a changeable working volume and has a working piston connected to the working chamber in order to change the working volume. The working piston is coupled to a support device of the holding device via a primary transmission device in such a way that a linear movement of the working piston causes a pivoting of the first flapping wing. The displacer is coupled to an adjustable kinematics of the flapping wing via a secondary transmission device in such a way that a turnover of the flapping wing controls the displacer in proper phase.

As shown in FIG. 13, the first step 310 can also be designated as step a), the second step 312 can be designated as step b) and the third step 314 can be designated as step c). The steps a), b) and c) may occur during the operation of the aircraft simultaneously, of course, and in a continuous manner.

Figure 14:
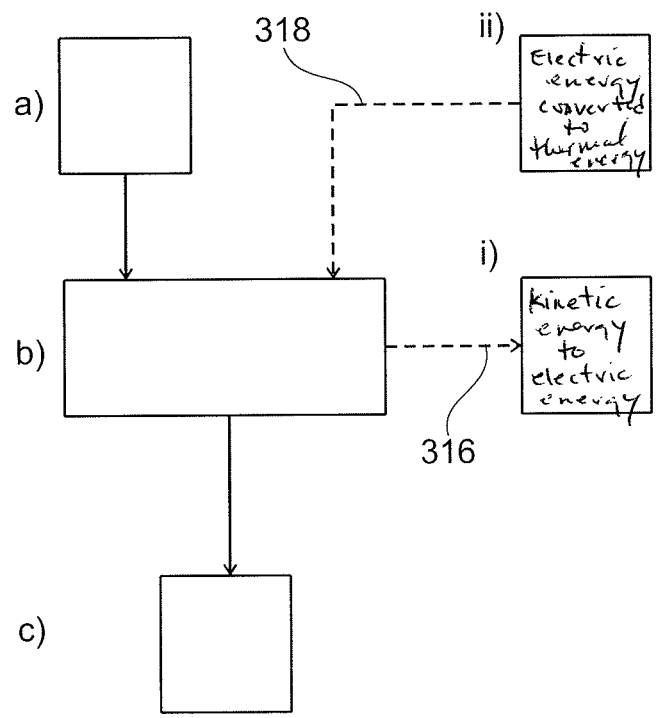
FIG. 14 illustrates a further example of a method according to the present invention.

According to a further exemplary embodiment, which is shown in FIG. 14, in a first phase, kinetic energy of the flat-plate Stirling engine is converted into electric energy in a conversion process 316 and is stored as electric energy. In a second phase, the stored electric energy is converted into thermal energy in a second conversion step 318 and thereby drives the Stirling engine, in order to provide the kinetic energy for driving the drive device.

In FIG. 14, the first phase is designated as step i) and the second phase as step ii). The first phase is provided for example when solar thermal radiation is present and the second phase when solar thermal radiation is reduced or not present, for example, at night. The storage and delivery of the electric energy via the storage device therefore takes place, e.g., in different phases, for which reason the connecting arrows of the first conversion step 316 as well as of the second conversion step 318 are shown respectively by a dashed line.

According to a further exemplary embodiment, which is not shown in detail, the method can include that the kinetic energy is converted into electric energy via the above-described generator. Additionally or alternatively, the electric energy can also be made available for example from photovoltaic elements or also from a fuel cell, as is explained above based on the various device variants. Accordingly, an explicit graphical representation or flow diagram of a corresponding method is not presented.

According to a further aspect of the invention, due to the combination of the flat-plate Stirling engine with an additional generation of electric energy during the day and the delivery of the electric energy and subsequent conversion into thermal energy at night, an airplane is possible that so to speak flies permanently or in an unlimited manner, as it derives its drive from solar heat. In this regard, in addition to the solar insolation during the day for the Stirling engine, an alternative energy source, as it were, is used at night, which was stored during the day in order to be available at night. To this end, the heat is converted into movement from the heat engine in the form of the Stirling engine and the movement is converted into current by a generator. A battery can store the excess energy during the day in order to re-convert it into heat at night and to drive the heat engine in the form of the flat-plate Stirling engine. In particular, the high efficiency of the flat-plate Stirling engine with the utilization of the thermal energy and the high yield of the electric energy with the generation of thermal energy, overall ensure a high efficiency.

The exemplary embodiments described above can be combined in different ways. In particular, alternative aspects of methods for variant embodiments of the devices as well as methods of using such variant embodiments of the devices are within the skill of those ordinarily skilled in the art.

In addition it should be noted that "comprising" does not exclude any other elements or steps and "one" does not exclude a plural. Furthermore, it should be noted that features or steps that have been described with reference to one of the above exemplary embodiments and aspects can also be used in combination with other features or steps of other exemplary embodiments and aspects described above. Reference numbers in the claims are not to be viewed as a restriction.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. An aircraft with an emission-free drive, comprising:
   a drive device, comprising a flapping wing device, structured and arranged to generate thrust;
   a lift device structured and arranged to generate lift; and
   a heat engine, comprising at least one flat-plate Stirling engine drivable by solar thermal radiation, structured and arranged to convert thermal energy into kinetic energy to drive the drive device,
   the flapping wing device including at least one flapping wing, which is pivotable transverse to a flight direction,
   wherein a working chamber is arranged between a wing top and a wing underside, and a displacer is arranged to divide the working chamber into a first and a second chamber region and, with movement, to displace a working gas from one of the first and second chamber region into the other of the first and second chamber region; and
   wherein the top of the wing forms a first side of the flat-plate Stirling engine with a first temperature and the underside of the wing forms a second side of the flat-plate Stirling engine with a second temperature, in which the second temperature is lower than the first temperature.

2. The aircraft according to claim 1, wherein the drive device further comprises a holding device structured and arranged to hold the at least one flapping wing to be pivotable around a pivot axis running transverse to the flight direction, and
   wherein the at least one Stirling engine comprises a working chamber with a changeable working volume, a displacer structured and arranged to be movable manner in the working chamber, and a working piston connected to change the working volume of the working chamber.

3. The aircraft according to claim 2, wherein the holding device further comprises a support device and the aircraft further comprises a primary transmission device structured and arranged to couple the working piston to the support device so that linear movement of the working piston produces a pivoting of the at least one flapping wing, and
   wherein the holding device further comprises adjustable kinematics and the aircraft further comprises a secondary transmission device structured and arranged to couple the displacer to the adjustable kinematics so that a turnover of the flapping wing controls the displacer in proper phase.

4. The aircraft according to claim 2, wherein the lift device comprises a wing device with a support airfoil profile that is structured and arranged to generate the lift, and
   wherein the flat-plate Stirling engine is arranged in the wing device.

5. The aircraft according to claim 2, wherein the working chamber is fillable with a working gas and the changeable working volume has a top and an underside, and the displacer is structured and arranged to be movable between the top and the underside, and
   wherein a regenerator is structured and arranged in the working chamber to collect and deliver thermal energy contained in the working gas, and the working chamber is arranged in the lift device and the working gas is heatable from a top of the lift device by solar insolation.

6. A The aircraft according to claim 5, with an emission-free drive, comprising:
   a drive device, comprising a flapping wing device, structured and arranged to generate thrust;
   a lift device structured and arranged to generate lift; and
   a heat engine, comprising at least one flat-plate Stirling engine drivable by solar thermal radiation, structured and arranged to convert thermal energy into kinetic energy to drive the drive device, and
   the flapping wing device including at least one flapping wing, which is pivotable transverse to a flight direction,
   wherein the drive device further comprises a holding device structured and arranged to hold the at least one flapping wing to be pivotable around a pivot axis running transverse to the flight direction,
   wherein the at least one Stirling engine comprises a working chamber with a changeable working volume, a displacer structured and arranged to be movable manner in the working chamber, and a working piston connected to change the working volume of the working chamber,
   wherein the working chamber is fillable with a working gas and the changeable working volume has a top and an underside, and the displacer is structured and arranged to be movable between the top and the underside,
   wherein a regenerator is structured and arranged in the working chamber to collect and deliver thermal energy contained in the working gas, and the working chamber is arranged in the lift device and the working gas is heatable from a top of the lift device by solar insolation,
   wherein the working chamber is arranged between a wing top and a wing underside, and the displacer is arranged to divide the working chamber into a first and a second chamber region and, with movement, to displace the working gas from one of the first and second chamber region into the other of the first and second chamber region; and
   wherein a top of the wing forms a first side of the flat-plate Stirling engine with a first temperature and the underside of the wing forms a second side of the flat-plate Stirling engine with a second temperature, in which the second temperature is lower than the first temperature.

7. The aircraft according to claim 6, further comprising a heating device structured and arranged to heat the working gas in one of the first and second chamber regions.

8. The aircraft according to claim 7, wherein the heating device comprises an electric heating device integrally embodied in the displacer that is structured and arranged to convert electric energy into thermal energy.

9. The aircraft according to claim 2, wherein the lift device comprises a light-transmitting cover arranged in the top region of the working chamber.

10. The aircraft according to claim 1, further comprising a power-generating device structured and arranged to generate electric energy to drive the aircraft.

11. The aircraft according to claim 10, wherein the power-generating device comprises a generator device structured and arranged to convert kinetic energy into electric energy and to be driven by the flat-plate Stirling engine.

12. The aircraft according to claim 10, wherein the power-generating device comprises photovoltaic elements structured and arranged to convert solar radiation into electric energy.

13. The aircraft according to claim 12, wherein the photovoltaic elements are arranged on the top of the displacer.

14. The aircraft according to claim 10, wherein the power-generating device comprises a fuel cell device and heat released with the operation of a fuel cell of the fuel cell device is fed to the working chamber of the flat-plate Stirling engine.

15. The aircraft according to claim 10, further comprising a storage device structured and arranged to store and deliver electric energy generated by the power-generating device,
wherein the power-generating device is structured and arranged to feed electric energy to the storage device and the storage device is structured and arranged to store the fed electric energy and to make the stored electric energy available for driving the aircraft.

16. A method for the emission-free driving of an aircraft, comprising:
receiving solar thermal energy to a flat-plate Stirling engine;
converting the thermal energy into kinetic energy via the flat-plate Stirling engine; and
driving, via the flat-plate Stirling engine, a drive device having a flapping wing device for thrust,
wherein a working chamber is arranged between a wing top and a wing underside, and a displacer is arranged to divide the working chamber into a first and a second chamber region and, with movement, to displace a working gas from one of the first and second chamber region into the other of the first and second chamber region; and
wherein the top of the wing forms a first side of the flat-plate Stirling engine with a first temperature and the underside of the wing forms a second side of the flat-plate Stirling engine with a second temperature, in which the second temperature is lower than the first temperature.

17. The method according to claim 16, wherein:
in a first phase, converting kinetic energy of the flat-plate Stirling engine into electric energy and storing the electric energy; and
in a second phase, converting the stored electric energy into thermal energy in an electric heating device, and driving the Stirling engine to provide the kinetic energy for driving the drive device.

18. An aircraft with at least one heat engine arranged in at least one of a wing and a fuselage to drive a flapping wing drive, the aircraft comprising:
a working chamber, having a top and an underside filled with a working gas, being located in the at least of the wing and fuselage;
a displacer structured and arranged for movement between the top and the underside of the working chamber to a define a first and a second chamber region; and
a working piston structured and arranged to adjust a working volume of the working chamber through a linear movement,
wherein the linear movement of the working piston pivotably drives at least one flapping wing of the flapping wing drive,
wherein the working chamber is arranged between a wing top and a wing underside, and the displacer is arranged to divide the working chamber into the first and the second chamber region and, with movement, to displace the working gas from one of the first and second chamber region into the other of the first and second chamber region; and
wherein the top of the wing forms a first side of the flat-plate Stirling engine with a first temperature and the underside of the wing forms a second side of the flat-plate Stirling engine with a second temperature, in which the second temperature is lower than the first temperature.

19. The aircraft according to claim 18, wherein the heat engine comprises a flat-plate Stirling engine.

20. The aircraft according to claim 18, further comprising an electric heating device one of integral with and coupled to the displacer to heat the working gas.

* * * * *